United States Patent
Choi et al.

(10) Patent No.: US 8,045,318 B2
(45) Date of Patent: Oct. 25, 2011

(54) TUNABLE CAPACITOR USING ELECTROWETTING PHENOMENON

(75) Inventors: Seung-tae Choi, Osan-si (KR); Ji-hyuk Lim, Suwon-si (KR); Woon-bae Kim, Suwon-si (KR); Eun-seok Park, Yongin-si (KR); Jeong-yub Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/652,948

(22) Filed: Jan. 6, 2010

(65) Prior Publication Data

US 2010/0110606 A1    May 6, 2010

Related U.S. Application Data

(62) Division of application No. 11/730,642, filed on Apr. 3, 2007, now Pat. No. 7,667,946.

(30) Foreign Application Priority Data

Oct. 12, 2006    (KR) ................ 10-2006-0099437

(51) Int. Cl.
*H01G 5/00* (2006.01)
(52) U.S. Cl. ........ 361/277; 361/272; 361/273; 361/278; 361/283.3; 361/290
(58) Field of Classification Search ............ 361/277, 361/280–281, 290–292, 272–273, 278–279, 361/283.1, 283.3
See application file for complete search history.

(56) References Cited

U.S. PATENT DOCUMENTS

| 4,450,500 | A | 5/1984 | Wollenschlager | |
| 7,031,136 | B2* | 4/2006 | Hunt et al. | 361/277 |
| 7,132,614 | B2* | 11/2006 | Beerling | 200/182 |
| 7,158,636 | B2 | 1/2007 | Ding | |
| 7,488,908 | B2 | 2/2009 | Beerling | |
| 7,505,246 | B2* | 3/2009 | Casset | 361/287 |
| 7,607,455 | B2* | 10/2009 | Furukawa et al. | 137/833 |
| 2004/0169992 | A1 | 9/2004 | Hunt et al. | |
| 2004/0264107 | A1 | 12/2004 | Hunt et al. | |
| 2005/0092606 | A1 | 5/2005 | Reich et al. | |

(Continued)

FOREIGN PATENT DOCUMENTS

JP    41-15467    8/1966

(Continued)

OTHER PUBLICATIONS

Choi, S.O. et al., "A Tunable Capacitor Using an Immiscible Bifluidic Dielectric", Microwave Symposium Digest, Jun. 2004, pp. 873-876, vol. 2, IEEE, XP 010728260, USA.

*Primary Examiner* — Nguyen T Ha
(74) *Attorney, Agent, or Firm* — Sughrue Mion, PLLC

(57) ABSTRACT

A tunable capacitor using an electrowetting phenomenon includes a first electrode; a second electrode which is spaced apart from the first electrode and faces the first electrode; a fluidic channel which is disposed between the first electrode and the second electrode; a first insulating layer which is disposed between the first electrode and the fluidic channel; and a conductive fluid which is disposed in the fluidic channel and moves along the fluidic channel when a direct current (DC) potential difference occurs between the first and second electrodes. Accordingly, it is possible to fabricate the tunable capacitor with the simplified fabrication process, good reliability and durability, and no restriction on the tuning range.

19 Claims, 11 Drawing Sheets

| U.S. PATENT DOCUMENTS | | | | FOREIGN PATENT DOCUMENTS | | |
|---|---|---|---|---|---|---|
| 2006/0004328 A1 | 1/2006 | Joergensen et al. | JP | 59-113615 A | 6/1984 |
| 2006/0108209 A1 | 5/2006 | Beerling | JP | 2005-117636 A | 4/2005 |
| 2006/0227494 A1 | 10/2006 | Beerling | WO | 2006/054006 A2 | 5/2006 |
| 2008/0037197 A1 | 2/2008 | Casset | | | |

* cited by examiner

TUNABLE CAPACITOR USING ELECTROWETTING PHENOMENON

CROSS-REFERENCE TO RELATED APPLICATIONS

This application is a divisional applicant of U.S. patent application Ser. No. 11/730,642 filed on Apr. 3, 2007. The entire disclosure of prior application Ser. No. 11/730,642 is considered part of the disclosure of the accompanying divisional application and is hereby incorporated by reference. This application claims priority under 35 U.S.C. §119 from Korean Patent Application No. 10-2006-0099437 filed on Oct. 12, 2006, in the Korean Intellectual Property Office, the disclosure of which is incorporated herein by reference in its entirety.

BACKGROUND OF THE INVENTION

1. Field of the Invention

Apparatuses consistent with the present invention relate to a tunable capacitor, and more particularly, to a tunable capacitor using an electrowetting phenomenon, which facilitates a fabrication process, provides good reliability and durability, and has no limitation on a tuning range.

2. Description of the Related Art

The present-day radio portable communication is advancing to multipurpose electronic devices that cover various functions such as camera, game, music play, broadcast, and Internet, beyond the basic telephone function and the messaging function. To service those various functions, it is required to transmit radio frequency (RF) data containing various additional information corresponding to the functions. Currently, a variety of frequency bands and communication protocols are being used for the RF data transmission. Particularly, fabrication of a reconfigurable RF transceiver, which can operate in the multibands and multistandards to meet a user's requirements, is necessary so as to integrate various communication standards into a handheld portable terminal. A tunable matching network using a tunable capacitor and a tunable inductor is requisite to this end.

Diverse techniques have been developed and utilized to fabricate a low and high frequency tunable capacitor. Specifically, the fabrication of a small tunable capacitor mostly adopts microelectromechanical systems (MEMS) technique, which can be divided according to a driving scheme into material property tuning (ferroelectric materials), electrostatic actuation, piezoelectric actuation, thermal actuation, electromagnetic actuation, electrodynamic actuation, and so forth. While using the diverse driving schemes, capacitance C to be ultimately controlled is expressed as a simple equation as below:

$$C = \in \cdot A/d$$

where $\in$ is a dielectric constant of a dielectric material, A is an area of parallel electrodes, and d is a distance between the parallel electrodes. Except in a case where the dielectric constant $\in$ of the dielectric material is changed, when tuning by varying the area A or the distance d, movement of a microstructure is requisite.

FIG. 1 depicts a dual-type tunable capacitor which varies the distance d between the parallel electrodes using the electrostatic actuation, for example of the MEMS tunable capacitor. Unfortunately, since the MEMS tunable capacitor, like many other MEMS elements, has a movable substance, its fabrication is complicated. Even after the fabrication, fatigue by the repetitive operations obstructs the durability and the reliability. In addition, the movable substance supported by a spring is vulnerable to impacts.

To tune the capacitance by varying the dielectric constant E of the dielectric material, a ferroelectric material such as Barium Strontium Titanate (BST) is used. Alternatively, two unmixable fluids having different dielectric constants are inserted into the microchannel including the parallel electrodes and then tuned by moving them. The former method takes advantage of a property that the ferroelectric material becomes a paraelectric material above the Curie temperature Tc and that the dielectric constant of the paraelectric material is changed by an external voltage. The BST allows controlling Tc to the room temperature and provides high dielectric constant in the microwave frequency and low loss, whereas it is needed to ensure the stable property of matter in view of the material. The latter method achieves the tuning by inserting two unmixable nonconductive materials between the fixed parallel electrodes and adjusting the quantity of the fluids between the electrodes. The greater difference between the dielectric constants of the two fluids, the larger tuning range. Since the nonconductive fluid, rather than the solid structure, is movable, the durability and the reliability can be achieved for a long term but another driving method is required to move the fluids.

SUMMARY OF THE INVENTION

The present invention has been provided to address the above-mentioned and other problems and disadvantages occurring in the related art arrangement, and an aspect of the present invention is to provide a variable capacitor using electrowetting phenomenon, which provides simple fabricating process, high reliability and durability, and unlimited tuning range.

According to an aspect of the present invention, there is provided a tunable capacitor comprising a first electrode; a second electrode which is spaced apart from the first electrode and faces the first electrode; a fluidic channel which is disposed between the first electrode and the second electrode; a first insulating layer which is disposed between the first electrode and the fluidic channel; and a conductive fluid which is disposed in the fluidic channel and moves along the fluidic channel when a direct current (DC) potential difference occurs between the first and second electrodes.

The tunable capacitor may further comprise a second insulating layer which is disposed between the second electrode and the fluidic channel.

The tunable capacitor may further comprise an alternating current (AC) electrode which is formed on a side of the second electrode to output an AC signal which passes through the first electrode, the first insulating layer, and the conductive fluid.

The tunable capacitor may further comprise a second insulating layer which is disposed between the second electrode and the fluidic channel and between the AC electrode and the fluidic channel.

The tunable capacitor may further comprise a first AC electrode which is formed on the side of the first electrode; and a second AC electrode which is formed on the side of the second electrode to face the first AC electrode. The first and second AC electrodes may transfer an AC signal through the conductive fluid.

The tunable capacitor may further comprise a second insulating layer which is formed between the second electrode and the fluidic channel and between the second AC electrode and the fluidic channel.

Each of the first electrode and the second electrode may comprise a plurality of electrodes.

The tunable capacitor may further comprise a first AC electrode which is formed between two of the first electrodes; and a second AC electrode which is formed between two of the second electrodes to face the first AC electrode. The first and second AC electrodes may transfer an AC signal through the first insulating layer and the conductive fluid.

The tunable capacitor may further comprise a second insulating layer which is disposed between the second electrode and the fluidic channel. The second AC electrode may be formed on a surface of the second insulating layer.

The tunable capacitor may further comprise a second insulating layer which is disposed between the second electrode and the fluidic channel and between the second AC electrode and the fluidic channel.

The tunable capacitor may further comprise a first coating layer which is formed between the first insulating layer and the fluidic channel to smooth movement of the conductive fluid.

The tunable capacitor may further comprise a second coating layer which is formed between the second insulating layer and the fluidic channel to smooth movement of the conductive fluid.

The fluidic channel may be in a ring shape with both ends connected to each other, and a part of the ring-shaped fluidic channel where the conductive fluid moves, may be wider than other parts.

The tunable capacitor may further comprise at least one fluid movement preventer which restricts movement of the conductive fluid in the fluidic channel.

The fluid movement preventer may be an area formed of a material adhesive to the conductive fluid, on a surface of at least one of the first and second insulating layers.

The fluid movement preventer may be a protrusion which protrudes from a surface of at least one of the first and second insulating layers and restricts the movement of the conductive fluid.

According to another aspect of the present invention, a tunable capacitor comprises a first electrode; a second electrode which is spaced apart from the first electrode and faces the first electrode; a fluidic channel which is formed between the first and second electrodes; and a nonconductive fluid which is disposed in the fluidic channel and moves along the fluidic channel when a DC potential difference occurs between the first and second electrodes.

The tunable capacitor may further comprise a first insulating layer which is disposed between the first electrode and the fluidic channel.

The tunable capacitor may further comprise a second insulating layer which is disposed between the second electrode and the fluidic channel.

The tunable capacitor may further comprise a first AC electrode which is formed on a side of the first electrode; and a second AC electrode which is formed on a side of the second electrode and faces the first AC electrode.

The tunable capacitor may further comprise a first insulating layer which is disposed between the first electrode and the fluidic channel and between the AC electrode and the fluidic channel.

The tunable capacitor may further comprise a second insulating layer which is disposed between the second electrode and the fluidic channel and between the AC electrode and the fluidic channel.

Each of the first and second electrodes may comprise a plurality of electrodes, respectively.

The tunable capacitor may further comprise a first AC electrode which is formed between two of the first electrodes; and a second AC electrode which is formed between two of the second electrodes to face the first AC electrode.

The tunable capacitor may further comprise a first insulating layer which is disposed between the first electrode and the fluidic channel. The first AC electrode may be formed on a surface of the first insulating layer.

The tunable capacitor may further comprise a first insulating layer which is disposed between the first electrode and the fluidic channel and between the first AC electrode and the fluidic channel.

The tunable capacitor may further comprise a second insulating layer which is disposed between the second electrode and the fluidic channel. The second AC electrode may be formed on a surface of the second insulating layer.

The tunable capacitor may further comprise a second insulating layer which is disposed between the second electrode and the fluidic channel and between the second AC electrode and the fluidic channel.

The tunable capacitor may further comprise a first coating layer which is formed between the first insulating layer and the fluidic channel to smooth movement of the nonconductive fluid.

The tunable capacitor may further comprise a second coating layer which is formed between the second insulating layer and the fluidic channel to smooth movement of the nonconductive fluid.

The fluidic channel may be in a ring shape with both ends connected to each other, and a part of the ring-shaped fluidic channel, where the nonconductive fluid moves, may be wider than other parts.

The tunable capacitor may further comprise at least one fluid movement preventer which restricts movement of the nonconductive fluid in the fluidic channel.

The fluid movement preventer may be an area formed of a material adhesive to the nonconductive fluid, on a surface of at least one of the first and second insulating layer.

The fluid movement preventer may be a protrusion which protrudes from a surface of at least one of the first and second insulating layer and restricts the movement of the nonconductive fluid.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
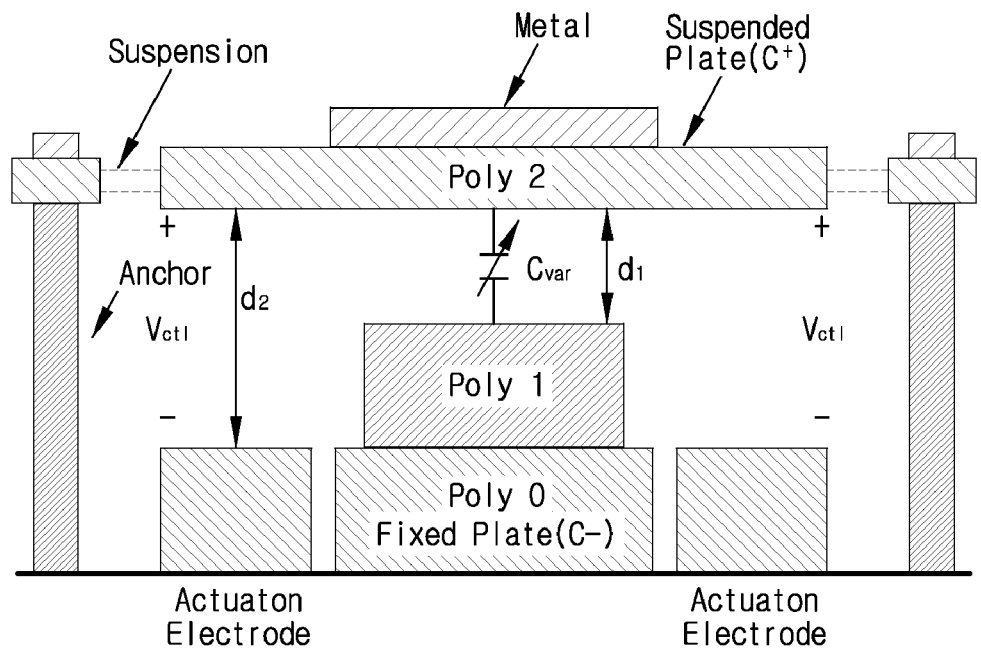
FIG. 1 is a diagram of a related art tunable capacitor.

Certain exemplary embodiments of the present invention will be described in greater detail with reference to the accompanying drawings.

In the following description, the same drawing reference numerals are used for the same to designate analogous elements throughout the drawings. The matters defined in the description such as a detailed construction and elements are provided to assist in a comprehensive understanding of the invention. However, the present invention can be carried out in different manners. Also, well-known functions or constructions are not described in detail since they would obscure the invention in unnecessary detail.

Figure 2:
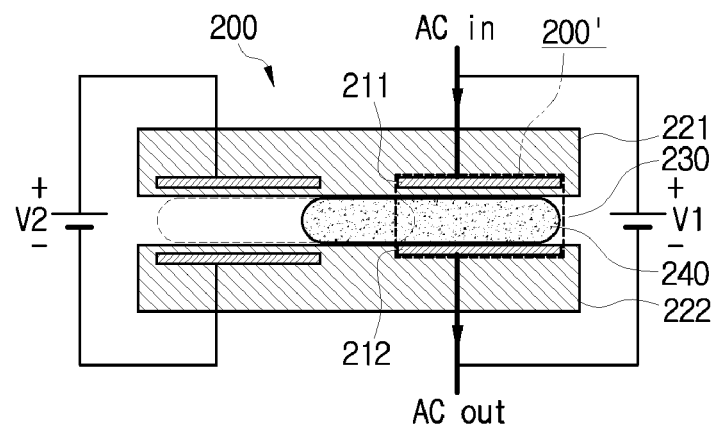
FIG. 2 is a vertical cross section view of a tunable capacitor structure according to an exemplary embodiment of the present invention.

FIG. 2 is a vertical cross section view of a tunable capacitor structure according to an exemplary embodiment of the present invention. Referring to FIG. 2, the tunable capacitor 200 comprises a first electrode 211, a second electrode 212, a first insulating layer 221, a fluidic channel 230, and a fluid 240.

The first electrode 211 and the second electrode 212 can be formed of a metal or alloy of such as Cr, Ni, Cu, Au, Ag, and Al. The second electrode 212 is disposed on a second insulating layer 222 and spaced apart from the first electrode 211 while facing the first electrode 211.

The fluidic channel 230 is formed between the first electrode 211 and the second electrode 212. The height of the fluidic channel 230 may range tens to hundreds of microns to lower a DC driving voltage by the first electrode 211 and the second electrode 212.

The first insulating layer 221 is interposed between the first electrode 211 and the fluidic channel 230. The first insulating layer 221 can be formed of a polymer or combination of silicon oxide, silicon nitride, glass, parylene, Teflon, and polydimethysiloxane (PDMS). The thickness of the first insulating layer 221 can be fabricated in a nano scale such as self assembled monolayer (SAM). Accordingly, the range of the capacitance to be implemented is variable and finely controllable.

The fluid 240 in the fluidic channel 230 can be a conductive fluid or a nonconductive fluid. First, explanation is provided for a case where the fluid 240 in the fluidic channel 230 is the conductive fluid.

The conductive fluid 240 is disposed in the fluidic channel 230. When a DC voltage V1 causes a DC potential difference between the first and second electrodes 211 and 212, the conductive fluid 240 moves along the fluidic channel 230 in a certain direction. Herein, the conductive fluid 240 can be a conductive fluidic metal such as Ga alloy.

Figure 3A:
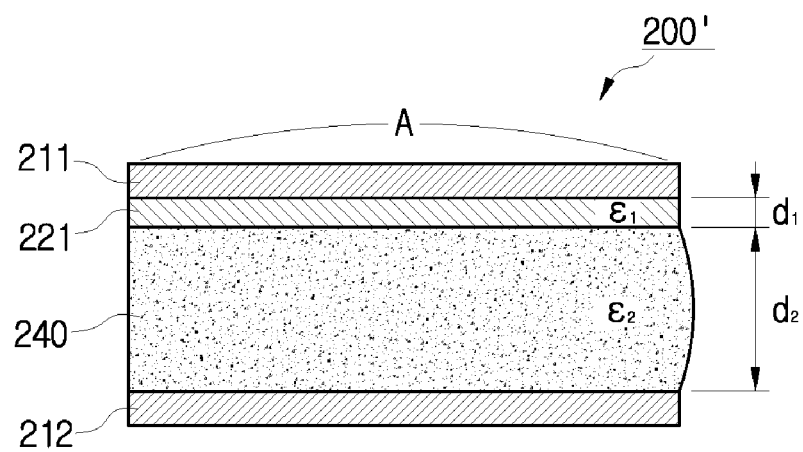
FIGS. 3A and 3B are diagrams showing a capacitance change of the tunable capacitor of FIG. 2, according to exemplary embodiments of the present invention.
Figure 3B:
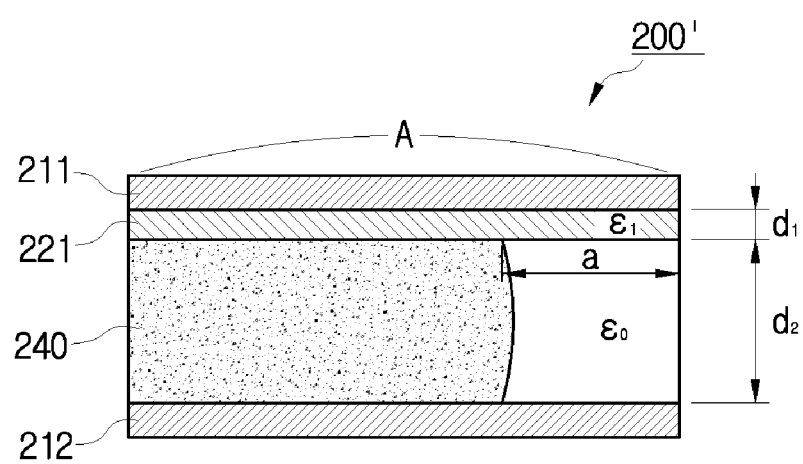

FIGS. 3A and 3B are diagrams showing a capacitance change according to the potential difference of the tunable capacitor 200 of FIG. 2, according to exemplary embodiments of the present invention. To ease the understanding, explanation centers on a part 200' which operates substantially as the capacitor.

Referring to FIG. 3A, since the second electrode 212 is exposed to the conductive fluid 240 and an alternating current (AC) by the second electrode 212 flows through the conductive fluid 240, the conductive fluid 240 functions as the second electrode 212. Hence, the first insulating layer 221 becomes the dielectric material of the capacitor 200'. Provided that the dielectric constant of the first insulating layer 221 is $\in 1$, an area overlapped commonly by the first insulating layer 221 and the conductive fluid 240, and the conductive fluid 240 and the second electrode 212 is A, and the thickness of the first insulating layer 221 under the first electrode 211 is d1, the capacitance C of the capacitor 200' is $C = \in 1 \cdot A/d1$.

Referring now to FIG. 3B, due to the DC voltage difference resulting from the voltage V1 applied to the first and second electrodes 211 and 212, the conductive fluid 240 moves to the left by the area a. Provided that the part where the conductive fluid 240 exists in the fluidic channel 230 is a first capacitor and the part where no conductive fluid 240 exists in the fluidic channel 230 is a second capacitor, the total capacitor 200' is parallel linking of the first and second capacitors. In this case, given the capacitances of the first and second capacitors are C1 and C2, respectively, the capacitance C1 is calculated as $C1 = \in 1 \cdot (A-a)/d1$. In contrast, as the capacitance C2 comprises the different dielectric materials (the first insulating layer 221 and the air in the fluidic channel 230), its capacitance is acquired reversely from the total voltage. Provided that the dielectric constant of the air in the fluidic channel 230 is $\in 0$ and the electric field in the section where the first insulating layer 221 is E1, $E1 = \sigma/\in 1$ ($\sigma$ is a surface charge density) and accordingly $E1 = q/(a \cdot \in 1)$ (q is a quantity of electric charge distributed over the area a). Provided that the electric field in the section without the first insulating layer 221, that is, the electric field in the section solely with the air is E2, $E2 = \sigma/\in 0$ and accordingly $E2 = q/(a \cdot \in 0)$. Hence, based on a relational expression as to the electric field and the voltage $V^* = E \cdot d$, the voltage $V1^*$ is $V1^* = q \cdot d1/(a \cdot \in 1)$ and the voltage $V2^*$ without the first insulating layer 221 is $V2^* = q \cdot d2/(a \cdot \in 0)$. Given the total voltage $V^*$ in the section without the conductive fluid 240, $V^* = V1^* + V2^*$. Based on a relational expression between the voltage and the capacitance $C = q/V^*$, the capacitance C2 is $C2 = a \cdot \in 1 \in 0/(d1 \in 0 + d2 \in 1)$ from $C2 = q/V^*$. Consequently, the total capacitance C' in FIG. 3B is $C' = C1 + C2$ by the parallel linking of the capacitors without regard for the fringe effect.

Herein, an electrowetting effect is used to control the conductive fluid 240 in the fluidic channel 230. The electrowetting phenomenon is a method of controlling a microdroplet by applying the electricity after dropping the microdroplet on the electrode coated with the insulating material.

Figure 4A:
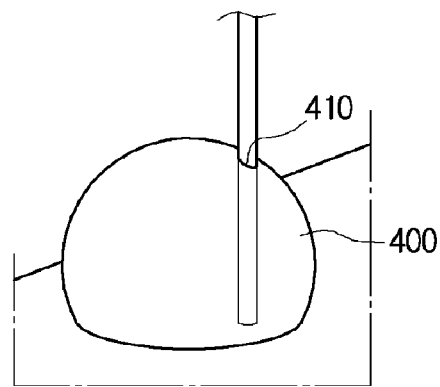
FIGS. 4A and 4B are vertical cross section views showing electrowetting phenomenon, according to exemplary embodiments of the present invention.
Figure 4B:
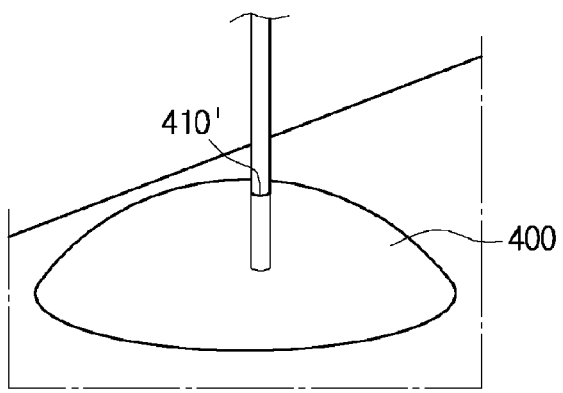

FIGS. 4A and 4B are vertical cross section views showing the electrowetting phenomenon, and particularly depict change of the surface tension (410->410') of the microdroplet 400 before and after electricity is applied, according to exemplary embodiments of the present invention. The electrowetting phenomenon using the surface tension of the microdroplet 400 can rapidly and effectively control flowing of the microdroplet using the low voltage and enables reverse movement and control of the fluid. Besides, the fluid control method using the electrowetting phenomenon has an advantage of simplified and cost effective fabrication, compared to other methods. Also, this method can save samples, compared to other methods which control flowing after filling the microchannel with a fluid. Years ago, while the electrowetting required hundreds of volts, the advance of the MEMS technique enables the electrowetting with a low voltage of several volts.

As such, the position of the conductive fluid 240 in the fluidic channel 230 can be controlled using the electrowetting phenomenon in the fluidic channel 230 by means of the DC electrodes. Accordingly, the capacitance can be tuned by varying the electrode area of the capacitor 200, the distance between the electrodes, and the dielectric constant of the dielectric material between the electrodes.

Now, explanation is provided on a case where the nonconductive fluid 240 is disposed in the fluidic channel 230 of the tunable capacitor 200 of FIG. 2.

Referring back to FIG. 2, the nonconductive fluid 240 is disposed in the fluidic channel 230. When the DC potential difference occurs between the first and second electrodes 211 and 212 by the DC voltage V1, the nonconductive fluid 240 moves along the fluidic channel 230 in a certain direction. The nonconductive fluid 240 can be a nonconductive material such as oil or deionized water.

FIGS. 3A and 3B are diagrams showing a capacitance change of the tunable capacitor 200 of FIG. 2 according to the potential difference. To ease the understanding, descriptions center on a part 200' which serves as the capacitor.

Referring to FIG. 3A, the first insulating layer 221 and the nonconductive fluid 240 function as the dielectric material of the capacitor 200'. Herein, the dielectric constant of the first insulating layer 221 is $\in1$, the dielectric constant of the nonconductive fluid 240 is $\in2$, and an area commonly overlapped by the first insulating layer 221 and the nonconductive fluid 240, and the nonconductive fluid 240 and the second electrode 212 is A. The thickness of the first electrode 211 under the first insulating layer 221 is d1 and the thickness of the fluidic channel 230 is d2. Hence, the capacitance C of the capacitor 200' is $C=A\cdot\in1\in2/(d1\in2+d2\in1)$. Its detailed calculation is the same as in the case of the conductive fluid 240, and further descriptions shall be omitted for brevity.

Referring to FIG. 3B, the nonconductive fluid 240 moves to the left by the area a because of the DC voltage difference according to the voltage V1 applied to the first and second electrodes 211 and 212. Provided that a part where the nonconductive fluid 240 is present in the fluidic channel 230 is a third capacitor and a part where the nonconductive fluid 240 is absent in the fluid channel 230 is a fourth capacitor, the total capacitor 200' is the parallel linking of the third and fourth capacitors. Given the respective capacitances C3 and C4, the capacitance $C3=(A-a)\cdot\in1\in2/(d1\in2+d2\in1)$ and the capacitance $C4=a\cdot\in1\in0/(d1\in0+d2\in1)$. From the parallel linking of the capacitors, the total capacitance C' is C3+C4.

As above, by generating the electrowetting phenomenon using the DC electrodes, the position of the nonconductive fluid 240 in the fluidic channel 230 can be controlled. Therefore, the capacitance can be tuned by varying the electrode area of the capacitor 200, the distance between the electrodes, and the dielectric constant of the dielectric material between the electrodes.

While the first and second electrodes are two electrodes in FIG. 2, each of the first and second electrodes can be implemented as one or more than three electrodes.

Figure 5:
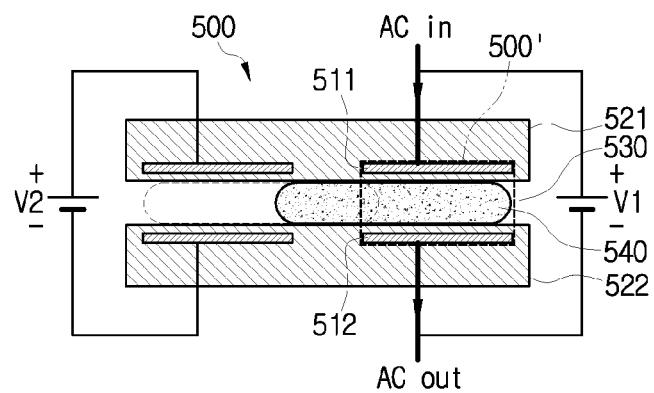
FIG. 5 is a vertical cross section view of a tunable capacitor according to an exemplary embodiment of the present invention.

FIG. 5 is a vertical cross section view of a tunable capacitor structure 500 according to an exemplary embodiment of the present invention. Compared to the tunable capacitor of FIG. 2, the tunable capacitor 500 further comprises a second insulating layer.

Referring to FIG. 5, the tunable capacitor 500 comprises a first electrode 511, a second electrode 512, a first insulating layer 521, a fluidic channel 530, a fluid 540, and a second insulating layer 522. The first electrode 511, the second electrode 512, the first insulating layer 521, and the fluid 540 are formed of the same materials as in FIG. 3, and their further explanation shall be omitted.

The second electrode 512 is spaced apart from the first electrode 511 while facing the first electrode 511. The fluidic channel 530 is formed between the first electrode 511 and the second electrode 512. The height of the fluidic channel 530 can range tens to hundreds of microns to lower the DC driving voltage by the first and second electrodes 511 and 512.

The first insulating layer 521 is disposed between the first electrode 511 and the fluidic channel 530, and the second insulating layer 522 is disposed between the second electrode 512 and the fluidic channel 530. The first and second insulating layers 521 and 522 can be formed of a polymer or a combination of silicon oxide, silicon nitride, glass, parylene, Teflon, and PDMS.

The fluid 540 in the fluidic channel 530 can be a conductive or nonconductive fluid. First, explanation is provided for a case where the fluid 540 is a conductive fluid.

The conductive fluid 540 resides in the fluidic channel 530. When the DC potential difference occurs between the first and second electrodes 511 and 512 due to the DC voltage V1, the conductive fluid 540 moves along the fluidic channel 530 in a certain direction.

Figure 6A:
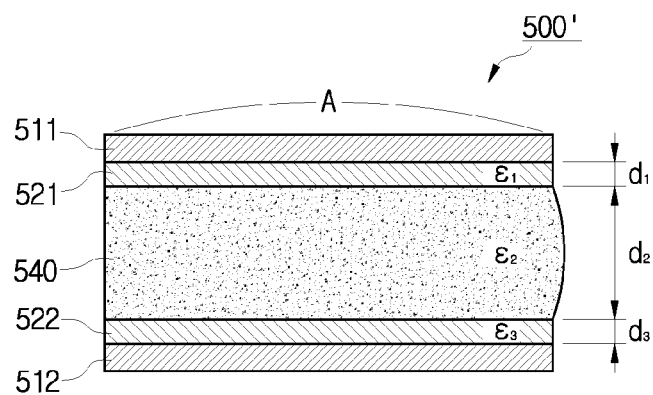
FIGS. 6A and 6B are diagrams showing a capacitance change of the tunable capacitor of FIG. 5, according to exemplary embodiments of the present invention.
Figure 6B:
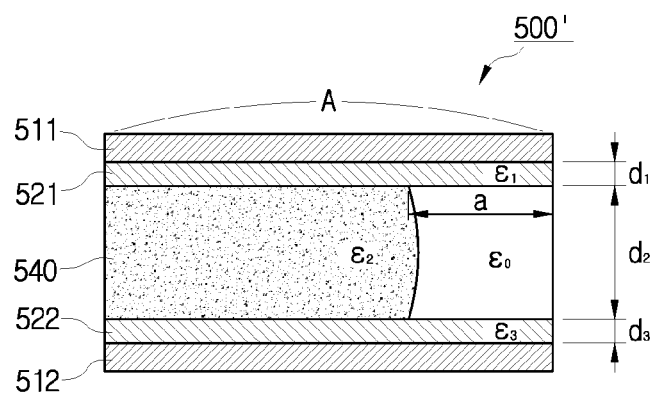

FIGS. 6A and 6B are diagrams showing a capacitance change according to the potential difference of the tunable capacitor 500 of FIG. 5, according to exemplary embodiments of the present invention. To ease the understanding, descriptions center on a part 500' which serves as the capacitor.

Referring to FIG. 6A, as the conductive fluid 540 moving in the fluidic channel 530 functions as the electrode, the first electrode 511, the first insulating layer 521 under the first electrode 511, and the conductive fluid 540 constitute a fifth capacitor, and the conductive fluid 540, the second electrode 512, the second insulating layer 522 on the second electrode 512, and the second electrode 512 constitute a sixth capacitor. Accordingly, the total capacitor 500 is serial linking of the two capacitors. Herein, the dielectric constant of the first insulating layer 521 and the second insulating layer 522 is $\in1$ and $\in3$, respectively, the thickness of the first insulator 521 and the second insulating layer 522 is d1 and d3, respectively, and an area commonly overlapped by the conductive fluid 540 with the first insulating layer 521 and the second insulating layer 522 is A. Given the electric capacity C5 of the fifth capacitor, $C5=\in1\cdot A/d1$. Given the electric capacity C6 of the sixth capacitor, $C6=\in3\cdot A/d3$. Hence, the electric capacity C of the total capacitor is $C=(C5+C6)/(C5\cdot C6)$ from the serial linking of the capacitors, without regard for the fringe effect.

Referring to FIG. 6B, the conductive fluid 540 shifts to the left by the area a according to the DC voltage difference at the first and second electrodes 511 and 512. When a part where the conductive fluid 540 is present in the fluidic channel 530 is a seventh capacitor and a part where the conductive fluid 540 is absent in the fluidic channel 530 is an eighth capacitor, the total capacitor 500 is a parallel linking of the seventh and eighth capacitors. Given the respective capacitors C7 and C8, the area overlapped by the first and second insulating layers 521 and 522 with the conductive fluid 540 is A−a. Accordingly, the capacitance C7 is the same as in the case where the area A is changed to A−a at the capacitance C of FIG. 6A. The capacitance C8 of the section where the conductive fluid 540 is absent can be calculated reversely from the total voltage, which is $C8=a\cdot\in0\in1\in3/(d1\in0\in3+d2\in1\in3+d3\in0\in1)$. Therefore, the total capacitance C' is C'=C7+C8 from the parallel linking of the capacitances.

As such, by generating the electrowetting phenomenon using the DC electrodes, it is possible to control the position of the conductive fluid 540 in the fluidic channel 530. As a result, the electrode area of the capacitor 500, the distance between the electrodes, and the dielectric constant of the dielectric material between the electrodes are subject to the change, thus tuning the capacitance.

Now, descriptions are provided for a case where the fluid 540 in the fluidic channel 530 is a nonconductive fluid in the tunable capacitor 500 of FIG. 5.

Referring back to FIG. 5, the nonconductive fluid 540 is disposed in the fluidic channel 530. When the DC potential difference occurs between the first and second electrodes 511 and 512 by the DC voltage V1, the nonconductive fluid 540 moves along the fluidic channel in a certain direction. Herein, the nonconductive fluid 540 can be a nonconductive material such as oil and deionized water.

FIGS. 6A and 6B are diagrams showing the capacitance change according to the potential difference of the tunable capacitor 500 of FIG. 5. To ease the understanding, descriptions center on the part 500' which substantially serves as the capacitor.

Referring to FIG. 6A, the first insulating layer 521, the nonconductive fluid 540, and the second insulating layer 522 function as the dielectric material of the capacitor 500'. The dielectric constant of the first and second insulating layers 521 and 522 is $\in 1$ and $\in 3$, respectively, the dielectric constant of the nonconductive fluid 540 is $\in 2$, the thickness of the first and second insulating layers 521 and 522 is d1 and d3, respectively, and the thickness of the fluidic channel 530 is d2. An area overlapped commonly by the nonconductive fluid 540 with the first insulating layer 521 and the second insulating layer 522 is A. The capacitance C of the capacitor 500' can be calculated reversely from the total voltage, and its detailed calculation shall be omitted.

Referring to FIG. 6B, the nonconductive fluid 540 moves to the left by the area a according to the DC voltage difference resulting from the voltage V1 applied to the first and second electrodes 511 and 512. When a part where the nonconductive fluid 540 is present in the fluidic channel 530 is a ninth capacitor and a part where the nonconductive fluid 540 is absent in the fluidic channel 530 is a tenth capacitor, the total capacitor 500 is a parallel linking of the ninth and tenth capacitors. In this case, given the respective capacitors C9 and C10, the area overlapped by the first and second insulating layers 521 and 522 with the nonconductive fluid 540 is A−a. Accordingly, the capacitance C9 is the same as in the case where the area A is changed to A−a at the capacitance C of FIG. 4B. The capacitance C10 in the section where the nonconductive fluid 540 is absent can be acquired reversely from the total voltage, and its detailed calculation shall be omitted. Therefore, the total capacitance C' is C'=C9+C10 from the parallel linking of the capacitances.

As such, by generating the electrowetting phenomenon using the DC electrodes, it is possible to control the position of the nonconductive fluid 540 in the fluidic channel 530. As a result, the electrode area of the capacitor 500, the distance between the electrodes, and the dielectric constant of the dielectric material between the electrodes are subject to the change, thus tuning the capacitor 500.

While the first and second electrodes are two electrodes in FIG. 5, each of the first and second electrodes can be implemented using one or more than three electrodes.

Figure 7:
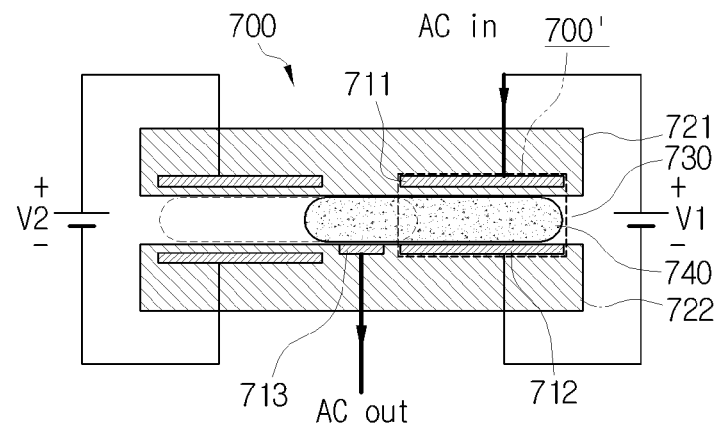
FIGS. 7 through 11 are diagrams of the tunable capacitor according to exemplary embodiments of the present invention.

FIG. 7 depicts a tunable capacitor structure according to an exemplary embodiment of the present invention. Referring to FIG. 7, the tunable capacitor 700 comprises a first electrode 711, a second electrode 712, a first insulating layer 721, a fluidic channel 730, a conductive fluid 740, and an AC electrode 713.

One of the first and second electrodes 711 and 712 which are the DC electrodes, that is, the first electrode 711 is shared with the AC electrode 713 to which an AC signal is applied, and the AC electrode 713 from which the AC signal is output is provided separately from the second electrode 712. The second electrode 712 and the AC electrode 713 are formed on a second insulating layer 722. The AC electrode 713 provided separately from the second electrode 712 is formed on the second insulating layer 722. In the tunable capacitor 700 according to another exemplary embodiment of the present invention, the second electrode 712 is shared with the AC electrode to which the AC signal is applied, and the AC electrode 713 from which the AC signal is output is provided separately from the first electrode 711.

The tunable capacitor 700 may further comprise a first coating layer (not shown). The first coating layer (not shown) is formed between the first insulating layer 721 and the fluidic channel 730 to smooth the movement of the conductive fluid 740. The tunable capacitor 700 may further comprise a second coating layer (not shown). The second coating layer (not shown) is formed between the second insulating layer 722 and the fluidic channel 730 to smooth the movement of the conductive fluid 740. The coating layer (not shown) can be formed of an anti-stiction material such as parylene and Teflon. In this case, as mentioned in FIGS. 3A and 3B, the capacitance can be tuned by varying the electrode area, the distance between the electrodes, and the dielectric constant of the dielectric material between the electrodes. Herein, detailed explanation relating to the part 700' which substantially serves as the capacitor shall be omitted.

While the first and second electrodes 711 and 712 are two electrodes in FIG. 7, each of the first and second electrodes can be implemented using one or more than three electrodes.

Figure 8:
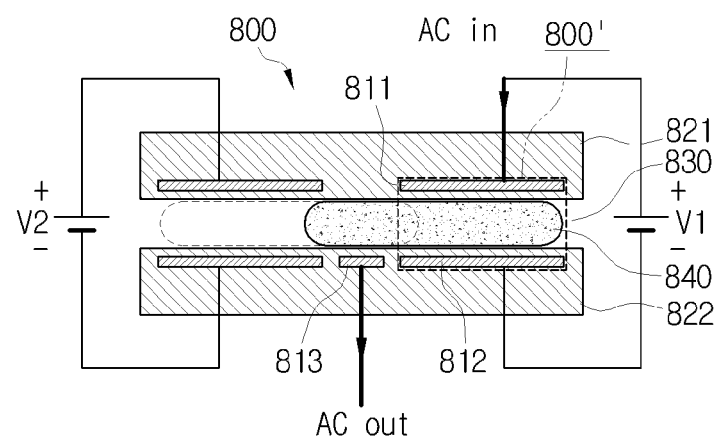

FIG. 8 depicts a tunable capacitor structure according to an exemplary embodiment of the present invention. In yet another exemplary embodiment of the present invention, the tunable capacitor further comprises a second insulating layer, compared to the tunable capacitor of FIG. 7.

Referring to FIG. 8, the tunable capacitor 800 comprises a first electrode 811, a second electrode 812, a first insulating layer 821, a second insulating layer 822, a fluidic channel 830, a conductive fluid 840, and an AC electrode 813. Specifically, compared to the exemplary embodiment of FIG. 7, the tunable capacitor 800 further comprises the second insulating layer 822 between the second electrode 812 and the fluidic channel 830 and between the AC electrode 813 and the fluidic channel 830.

One of the first and second electrodes 811 and 812, which are the DC electrodes, that is, the first electrode 811 is shared with the AC electrode to which an AC signal is applied, and the AC electrode 813 from which the AC signal is output is separately provided separately from the second electrode 812. In the tunable capacitor 800 according to yet another exemplary embodiment of the present invention, the second electrode 812 is shared with the AC electrode to which the AC signal is applied, and the AC electrode 813 from which the AC signal is output is separately provided separately from the first electrode 811.

The tunable capacitor 800 may further comprise a first coating layer (not shown). The first coating layer (not shown) is formed between the first insulating layer 821 and the fluidic channel 830 to facilitate the movement of the conductive fluid 840. Also, the tunable capacitor 800 may further comprise a second coating layer (not shown). The second coating layer (not shown) is formed between the second insulating layer 822 and the fluidic channel 830 to smooth the movement of the conductive fluid 840. The coating layer (not shown) can be formed of an anti-stiction material such as parylene and Teflon. As mentioned in FIGS. 6A and 6B, the capacitance can be tuned by varying the electrode area, the distance between the electrodes, and the dielectric constant of the dielectric material between the electrodes. Herein, detailed description relating to a part 800' which serves substantially as the capacitor shall be omitted.

While the first and second electrodes 811 and 812 are two electrodes in FIG. 8, each of the first and second electrodes can be implemented using one or more than three electrodes.

Figure 9:
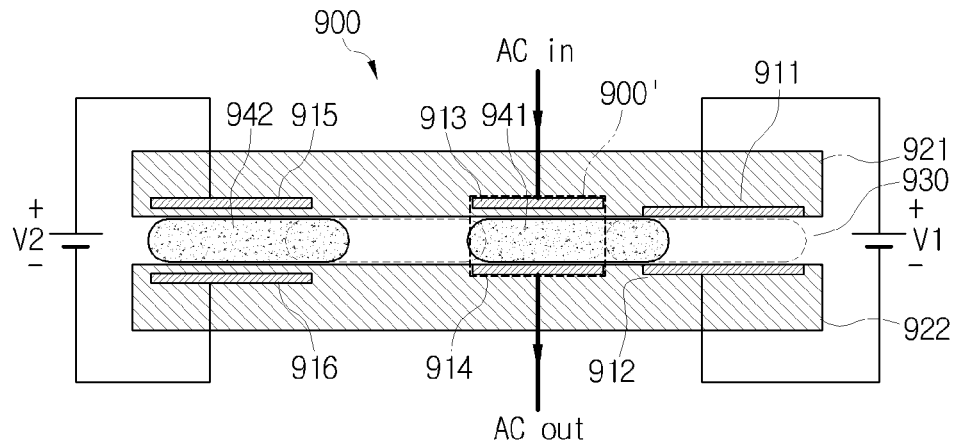
Figure 10:
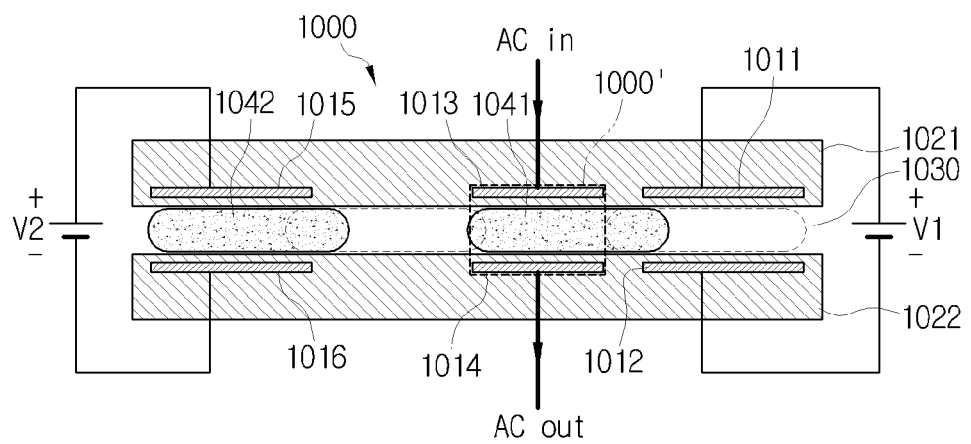

FIGS. 3 and 8 show the tunable capacitor in which part or all of the DC electrode and the AC electrode are shared. To prevent the DC driving voltage from operating in the AC circuit, it may be necessary to separately install a DC blocking capacitor in some cases. FIGS. 9 and 10 show a tunable capacitor which separates the DC driving electrode from the AC driving electrode to avoid the installation of the DC blocking capacitor.

FIG. 9 depicts a tunable capacitor structure according to an exemplary embodiment of the present invention. Referring to FIG. 9, the tunable capacitor 900 comprises a first electrode 911, a second electrode 912, a first insulating layer 921, a fluidic channel 930, a fluid 941, a first AC electrode 913, and a second AC electrode 914. The first and second electrodes 911 and 912, which are the DC electrodes, are provided separately from the first and second AC electrodes 913 and 914 which the AC signal is applied to and output from. The part 900' in FIG. 9 shows the AC driving electrodes including the first and second electrodes 913 and 914.

The second electrode 912 is disposed on a second insulating layer 922 and spaced apart from the first electrode 911 while facing the first electrode 911. The fluidic channel 930 is formed between the first and second electrodes 911 and 912. The first insulating layer 921 is disposed between the first electrode 911 and the fluidic channel 930.

The fluid 941 is disposed within the fluidic channel 930. When a DC potential difference occurs between the first and second electrodes 911 and 912 by the DC voltage V1, the fluid 941 moves among the fluidic channel 930 in a certain direction.

The first AC electrode 913 is formed on the side of the first electrode 911 based on the fluidic channel 930. The second AC electrode 914 is disposed on the second insulating layer 922 and formed on the side of the second electrode 912 based on the fluidic channel 930 while facing the first AC electrode 913.

While the first and second electrodes 911, 912, 915, and 916 are two electrodes, respectively, each of the first and second electrodes can be implemented using one or more than three electrodes. In this case, a plurality of fluids 941 and 942 can be present in the fluidic channel 930. The unmixable fluids 941 and 942 will do, and it is not specified whether the fluids 941 and 942 are conductive or nonconductive.

The fluid can be shifted by driving one or both of the two pairs of the DC electrodes 911, 912, 915, and 916. In this case, the capacitance can be tuned by varying the electrode area, the distance between the electrodes, and the dielectric constant of the dielectric material between the electrodes as illustrated in FIGS. 3A and 3B.

FIG. 10 depicts a tunable capacitor structure according to an exemplary embodiment of the present invention. Compared to the tunable capacitor of FIG. 9, the tunable capacitor of FIG. 10 further comprises a second insulating layer.

Referring to FIG. 10, the tunable capacitor 1000 comprises a first electrode 1011, a second electrode 1012, a first insulating layer 1021, a fluidic channel 1030, a fluid 1041, a first AC electrode 1013, a second AC electrode 1014, and a second insulating layer 1022. Compared to FIG. 9, the tunable capacitor 1000 further comprises the second insulating layer 1022 between the second electrode 1012 and the fluidic channel 1030 and between the second AC electrode 1014 and the fluidic channel 1030. The part 1000' in FIG. 10 shows AC driving electrodes including the first and second electrodes 1013 and 1014.

Likewise, each of the first and second electrodes 1011, 1012, 1015 and 1016 can be implemented using one or more than three electrodes, and a plurality of fluids 1041 and 1042 can exist in the fluidic channel 1030. The unmixable fluids 1041 and 1042 will do, and it is not specified whether the fluids 1041 and 1042 are conductive or nonconductive. As mentioned in FIGS. 6A and 6B, the capacitance can be tuned by varying the electrode area, the distance between the electrodes, and the dielectric constant of the dielectric material between the electrodes.

Figure 11:
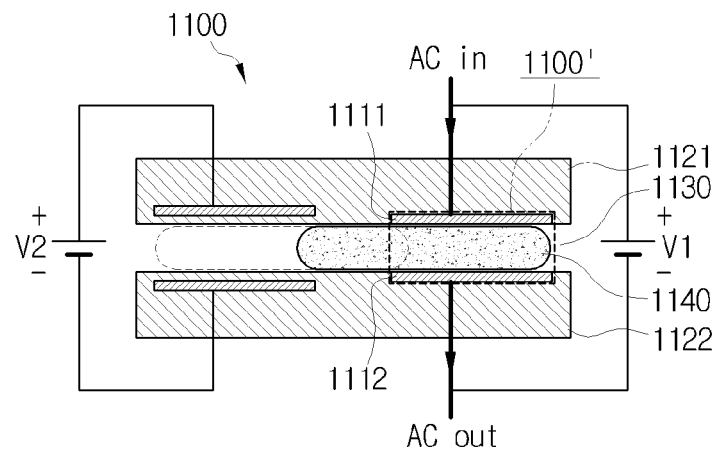

FIG. 11 is a vertical cross section view of a tunable capacitor structure according to an exemplary embodiment of the present invention, which can be added in the event of a non-conductive fluid in a fluidic channel. Compared to the tunable capacitor of FIG. 2, a first insulating layer between the first electrode and the fluidic channel is eliminated.

Referring to FIG. 11, the tunable capacitor 1100 comprises a first electrode 1111, a second electrode 1112, a fluidic channel 1130, and a nonconductive fluid 1140. The second electrode 1112 is disposed on a second insulating layer 1122. The first and second electrodes 1111 and 1112 are in close contact with the fluidic channel 1130, which are separately illustrated according to the exemplary embodiment because they are not shown in the event of the conductive fluid in the fluidic channel. The tunable capacitor 1100 according to this exemplary embodiment has a similar tuning range and to that of the tunable capacitor with the nonconductive fluid according to the exemplary embodiments of FIGS. 3A, 3B, 6A and 6B. The part 1100' in FIG. 11 shows AC driving electrodes including the first and second electrodes 1111 and 1112.

FIGS. 12A through 12E depict various structures to restrict the movement of the fluid according to exemplary embodiments of the present invention.

Figure 12A:
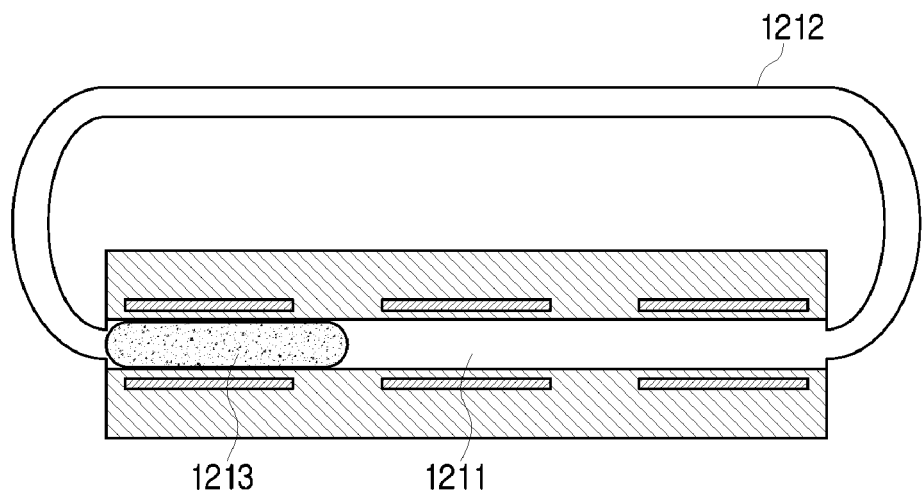
FIGS. 12A through 12E are diagrams of a tunable capacitor according to exemplary embodiments of the present invention.

Referring to FIG. 12A, fluidic channels 1211 and 1212 are in a ring shape with both ends connected to each other. A fluidic channel part 1211 in which a fluid 1213 moves, has the width wider than the fluidic channel part 1212 so as to restrict the movement of the conductive fluid 1213.

Figure 12B:
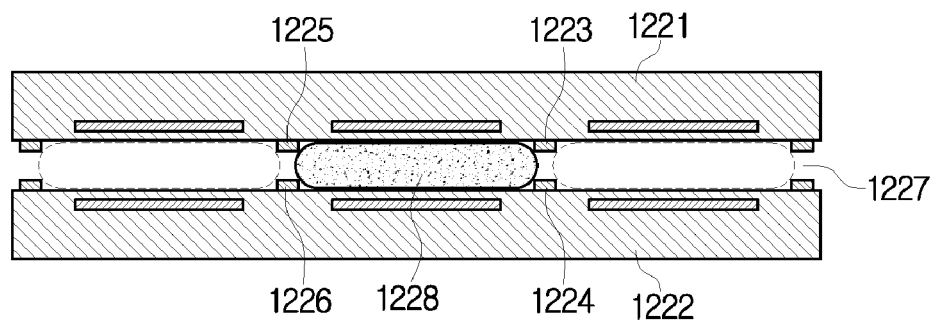
Figure 12C:
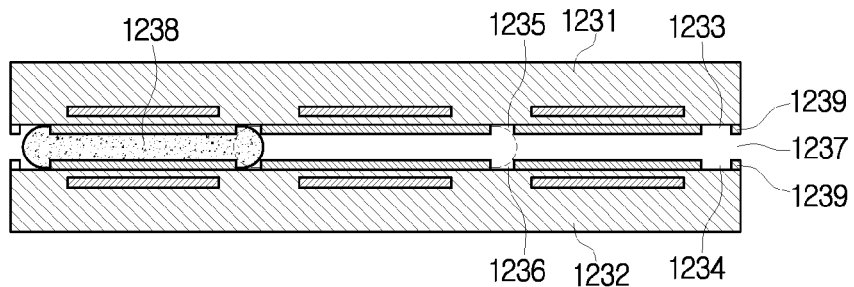
Figure 12D:
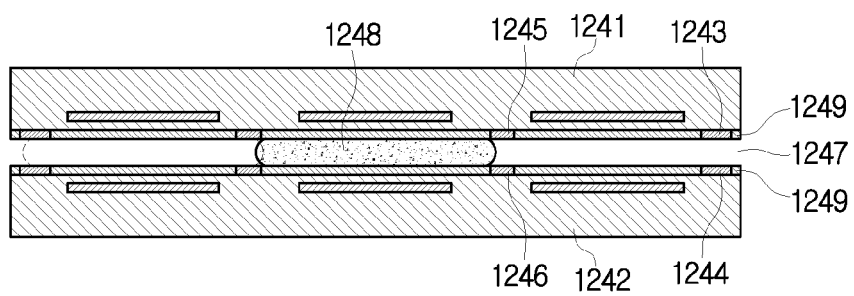

Referring to FIGS. 12B, 12C and 12D, fluid movement preventers 1223 through 1226, 1233 through 1236, and 1243 through 1246 are provided in fluidic channels 1227, 1237 and 1247 to restrict and control the movement of fluids 1228, 1238, and 1248. The fluid movement preventers 1223 through 1226, 1233 through 1236, and 1243 through 1246 may be areas formed of a material adhesive to the fluids 1228, 1238 and 1248 to some degree.

Referring to FIG. 12B, the fluid movement preventers 1223 through 1226 can be formed using protrusions 1223 through 1226 on a surface of at least one of first and second insulating layers 1221 and 1222. The protrusions 1223 through 1226 can restrict the movement of the fluid 1228 within the fluidic channel 1227. The protrusions 1223 through 1226 can be formed of metal or alloy of Cr, Ni, Cu, Au, Ag, and Al, and may vary depending on the type of the acting fluid (e.g., hydrophilic property and hydrophobic property of the acting fluid).

Referring to FIG. 12C, fluid movement preventers 1233 through 1236 are formed by forming a coating layer 1239, which smoothes the movement of a fluid 1238 in a fluidic channel 1237, on a surface of at least one of first and second insulating layers 1231 and 1232 and eliminating an area of the coating layer 1239. The coating layer 1239 can be formed of an anti-stiction material such as parylene or Teflon.

Referring to FIG. 12D, fluid movement preventers 1243 through 1246 can be formed by forming a coating layer 1249, which smoothes the movement of a fluid 1248 in a fluidic channel 1247, on a surface of at least one of first and second insulating layers 1241 and 1242, eliminating an area of the coating layer 1249, and using a metal or alloy of Cr, Ni, Cu, Au, Ag, and Al in the coating-free area 1243 through 1246 as shown in FIG. 10B, thus restricting the fluid movement. The fluid movement preventers 1243 through 1246 may vary depending on the type of the acting fluid (e.g., hydrophilic property and hydrophobic property of the acting fluid).

Figure 12E:
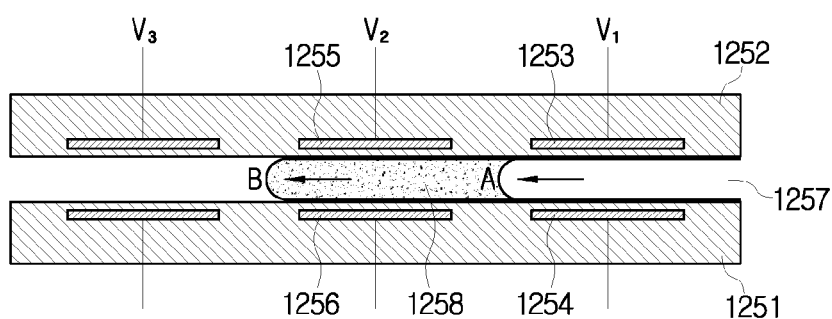

Referring to FIG. 12E, a plurality of DC electrodes 1253 through 1256 are provided to restrict the movement of a fluid 1258 provided between the first and second insulating layers 1252 and 1251. First, when a voltage V1 is applied to the electrodes 1253 and 1254 to drive them, a fluid 1258 is moved to the part A in a fluidic channel 1257. Next, when a voltage V2 is applied to the electrodes 1255 and 1256 to drive them, the fluid 1258 is shifted to the part B.

Figure 13A:
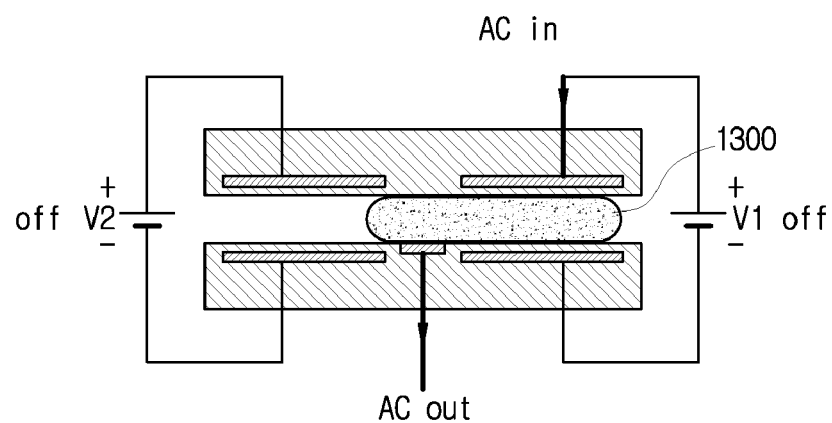
FIGS. 13A and 13D are diagrams showing a driving method of the tunable capacitor according to an exemplary embodiment of the present invention.
Figure 13B:
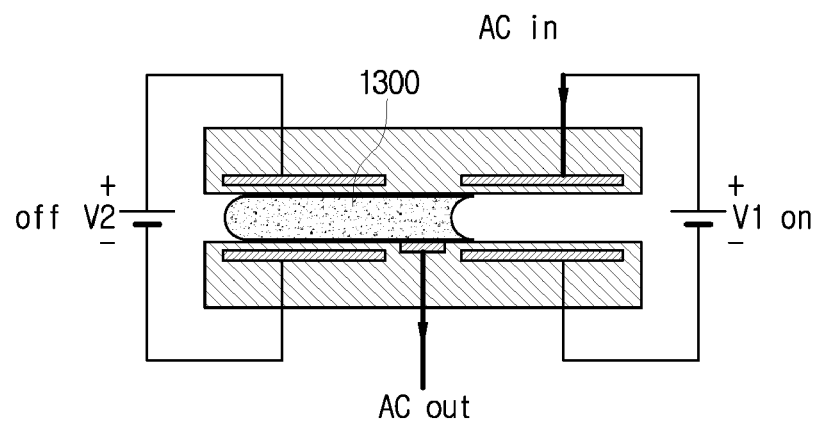
Figure 13C:
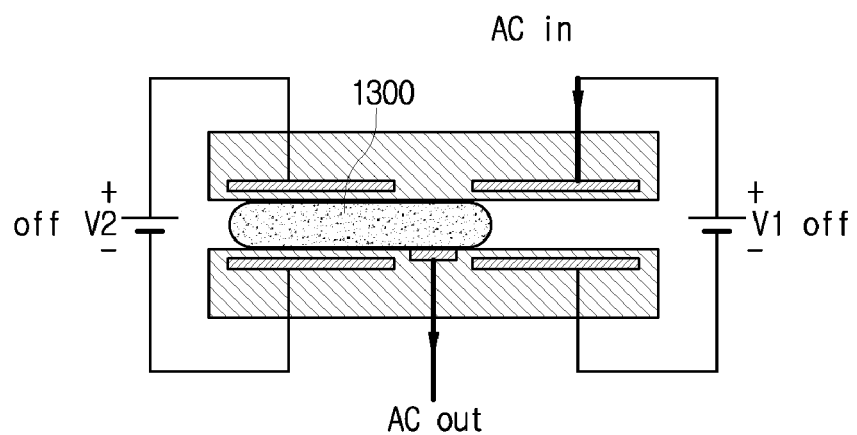
Figure 13D:
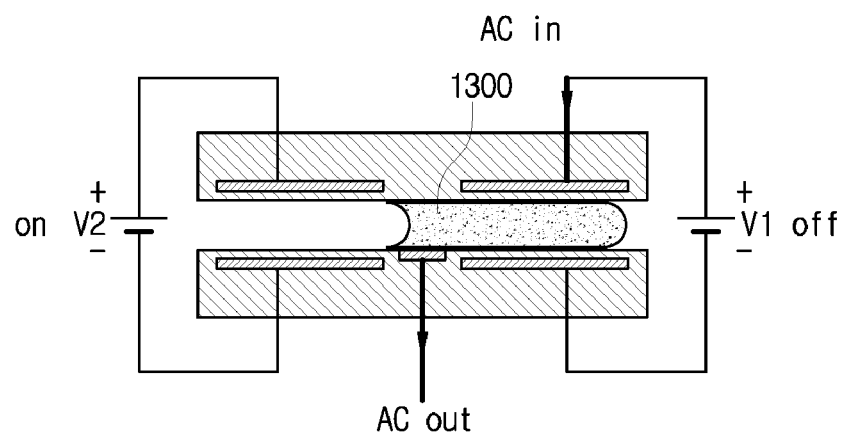

FIGS. 13A and 13D depict a driving method of the tunable capacitor of FIG. 7.

FIG. 13A shows a non-driving status of the DC electrodes V1 and V2. The conductive fluid 1300 maintains the maximum capacitance without moving.

FIG. 13B shows that the conductive fluid 1300 is shifted to the left to acquire an intended capacitance by driving the electrode by applying the voltage V1 to the right DC electrode.

FIG. 13C shows that the changed capacitance is tied up by stopping the movement of the conductive fluid 1300 by suspending the driving of the right DC electrode of FIG. 13B.

FIG. 13D shows the conductive fluid 1300 is shifted to the right to acquire the original capacitance by driving the electrode with the voltage V2 applied to the left DC electrode.

Consequently, the intended capacitance can be adjusted and acquired by moving the position of the conductive fluid within the fluidic channel.

While the driving method of the tunable capacitor of FIG. 7 has been illustrated, the driving methods of the tunable capacitor according to the other exemplary embodiments of the present invention are the same.

FIGS. 14A through 14D are diagrams showing a fabrication method of the tunable capacitor according to an exemplary embodiment of the present invention.

Figure 14A:
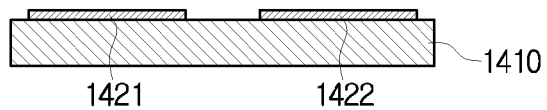
FIGS. 14A through 14D are diagrams showing a fabrication method of the tunable capacitor according to an exemplary embodiment of the present invention.

Referring to FIG. 14A, first electrodes 1421 and 1422 are deposited on a substrate 1410.

Figure 14B:
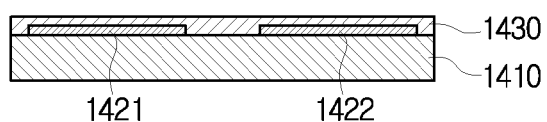

As shown in FIG. 14B, a first insulating layer 1430 is formed over the substrate 1410 and the first electrodes 1421 and 1422 to seal the exposed area of the substrate 1410 and the first electrodes 1421 and 1422.

Figure 14C:
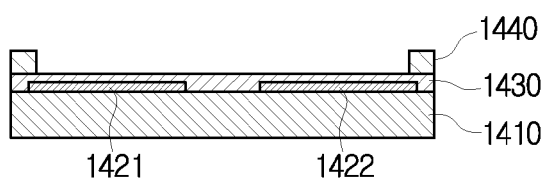

As shown in FIG. 14C, a bonding layer 1440 is formed on an area of the first insulating layer 1430 for the connection with another structure. Apart from the structure of FIG. 14C, second electrodes 1461 and 1462, a second insulating layer 1470, and a bonding layer 1480 are sequentially formed on another substrate 1450. The processes of FIGS. 14A, 14B and 14C are applied to the fabrication of the other structure.

Figure 14D:
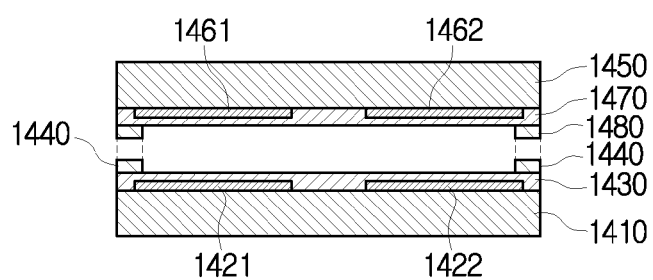

Next, as shown in FIG. 14D, the structures fabricated on the substrates 1410 and 1450 are bonded to each other while facing each other based on the bonding layers 1440 and 1480, to thus fabricate the tunable capacitor.

While the tunable capacitor comprises both the first and second insulating layers in the exemplary embodiments of the present invention, a tunable capacitor comprising one or both of the first and second insulating layers can be fabricated using a method similar to the method of FIGS. 14A through 14D.

Thus, using the electrowetting phenomenon, the tunable capacity can be provided with the simplified fabrication, good reliability and durability, and no restriction on the tuning range.

In light of the foregoing, since the fluid merely moves within the fluidic channel, the fabrication can be facilitated and the breakage due to the repetitive deformation of the solid structure can be avoided. Therefore, the tunable capacitor can be provided with the good reliability and durability.

Since the thickness of the inner wall of the fluidic channel can be fabricated in the nano-scale, the range of the capacitance varies. Therefore, the tunable capacitor without any restriction on the tuning range can be provided.

Furthermore, it is possible to fabricate the tunable capacitor which can lower the driving voltage by fabricating the fluidic channel in the height of tens to hundreds of microns if necessary.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative only, and not to limit the scope of the claims, as many alternatives, modifications, and variations will be apparent to those skilled in the art. Therefore, the scope of the present invention should be defined by the appended claims and their equivalents.

What is claimed is:

1. A tunable capacitor comprising:
   a first electrode;
   a second electrode which is spaced apart from the first electrode and faces the first electrode;
   a fluidic channel which is formed between the first and second electrodes; and
   a nonconductive fluid which is disposed in the fluidic channel and moves along the fluidic channel in a direction away from the first and second electrodes when a direct current (DC) potential difference occurs between the first and second electrodes due to a voltage supplied to the first and second electrodes.

2. The tunable capacitor of claim 1, further comprising:
   a first insulating layer which is disposed between the first electrode and the fluidic channel.

3. The tunable capacitor of claim 2, further comprising:
   a second insulating layer which is disposed between the second electrode and the fluidic channel.

4. The tunable capacitor of claim 1, further comprising:
   a first alternating current (AC) electrode which is formed on a side of the first electrode; and
   a second AC electrode which is formed on a side of the second electrode and faces the first AC electrode.

5. The tunable capacitor of claim 4, further comprising:
   a first insulating layer which is disposed between the first electrode and the fluidic channel and between the AC electrode and the fluidic channel.

6. The tunable capacitor of claim 5, further comprising:
   a second insulating layer which is disposed between the second electrode and the fluidic channel and between the AC electrode and the fluidic channel.

7. The tunable capacitor of claim 6, further comprising:
a second coating layer which is formed between the second insulating layer and the fluidic channel to smooth movement of the nonconductive fluid.

8. The tunable capacitor of claim 5, further comprising:
a first coating layer which is formed between the first insulating layer and the fluidic channel to smooth movement of the nonconductive fluid.

9. The tunable capacitor of claim 1, wherein each of the first and second electrodes comprises a plurality of electrodes.

10. A tunable capacitor comprising:
a first electrode;
a second electrode which is spaced apart from the first electrode and faces the first electrode;
a fluidic channel which is formed between the first and second electrodes;
a nonconductive fluid which is disposed in the fluidic channel and moves along the fluidic channel when a direct current (DC) potential difference occurs between the first and second electrodes;
a first alternating current (AC) electrode which is formed between two of the first electrodes; and
a second AC electrode which is formed between two of the second electrodes to face the first AC electrode;
wherein each of the first and second electrodes comprises a plurality of electrodes.

11. The tunable capacitor of claim 10, further comprising:
a first insulating layer which is disposed between the first electrode and the fluidic channel,
wherein the first AC electrode is formed on a surface of the first insulating layer.

12. The tunable capacitor of claim 11, further comprising:
a second insulating layer which is disposed between the second electrode and the fluidic channel,
wherein the second AC electrode is formed on a surface of the second insulating layer.

13. The tunable capacitor of claim 11, further comprising:
a second insulating layer which is disposed between the second electrode and the fluidic channel and between the second AC electrode and the fluidic channel.

14. The tunable capacitor of claim 10, further comprising:
a first insulating layer which is disposed between the first electrode and the fluidic channel and between the first AC electrode and the fluidic channel.

15. The tunable capacitor of claim 14, further comprising:
a second insulating layer which is disposed between the second electrode and the fluidic channel and between the second AC electrode and the fluidic channel.

16. A tunable capacitor comprising:
a first electrode;
a second electrode which is spaced apart from the first electrode and faces the first electrode;
a fluidic channel which is formed between the first and second electrodes; and
a nonconductive fluid which is disposed in the fluidic channel and moves along the fluidic channel when a direct current (DC) potential difference occurs between the first and second electrodes, wherein the fluidic channel is in a ring shape with both ends connected to each other, and
a part of the ring-shaped fluidic channel, where the nonconductive fluid moves, is wider than other parts.

17. A tunable capacitor comprising:
a first electrode;
a second electrode which is spaced apart from the first electrode and faces the first electrode;
a fluidic channel which is formed between the first and second electrodes;
a nonconductive fluid which is disposed in the fluidic channel and moves along the fluidic channel when a direct current (DC) potential difference occurs between the first and second electrodes; and
at least one fluid movement preventer which restricts movement of the nonconductive fluid in the fluidic channel.

18. The tunable capacitor of claim 17, wherein the fluid movement preventer is an area, formed of a material adhesive to the nonconductive fluid, on a surface of at least one of the first and second insulating layer.

19. The tunable capacitor of claim 17, wherein the fluid movement preventer is a protrusion which protrudes from a surface of at least one of the first and second insulating layer and restricts the movement of the nonconductive fluid.

* * * * *